US005448767A

United States Patent [19]

de Bot

[11] Patent Number: 5,448,767

[45] Date of Patent: Sep. 5, 1995

[54] TRANSMITTER NETWORK WITH A SINGLE TRANSMITTER FREQUENCY

[75] Inventor: Paulus G. M. de Bot, Eindhoven, Netherlands

[73] Assignee: U.S. Philips Corporation, New York, N.Y.

[21] Appl. No.: 341,329

[22] Filed: Nov. 16, 1994

Related U.S. Application Data

[63] Continuation of Ser. No. 34,012, Mar. 24, 1993, abandoned.

[30] Foreign Application Priority Data

Apr. 28, 1992 [EP] European Pat. Off. ........... 92201191

[51] Int. Cl.[6] .......................... H04B 1/02

[52] U.S. Cl. .......................... 455/105; 455/33.4; 455/56.1; 379/59

[58] Field of Search .................. 455/51.1, 103, 105, 455/16, 33.4, 56.1; 379/59

[56] References Cited

U.S. PATENT DOCUMENTS 4,670,899 6/1987 Brody et al. .................. 455/56.1
4,726,266 2/1988 Perry .................. 455/33.4
5,038,403 8/1991 Leitch .................. 455/51
5,260,988 11/1993 Schellinger et al. .................. 379/59
5,295,180 3/1994 Vendetti et al. .................. 455/33.4

FOREIGN PATENT DOCUMENTS 0342858 11/1989 European Pat. Off. .

*Primary Examiner*—Edward F. Urban
*Assistant Examiner*—Mary M. Lin
*Attorney, Agent, or Firm*—Leroy Eason

[57] ABSTRACT

Improved transmitter network with a single transmitter frequency.

A transmitter network comprising a plurality of transmitters having a like transmitter frequency may cause disturbance to occur in an adjacent similar transmitter network. This disturbance is not of an echo signal type, so that cancellation thereof is difficult. For eliminating this disturbance as much as possible, a transmitter network is used wherein a main transmitter is associated with auxiliary transmitters having an aerial height which becomes smaller for auxiliary transmitters located more closely to the boundary of the desired coverage area of the system.

1 Claim, 2 Drawing Sheets

TRANSMITTER NETWORK WITH A SINGLE TRANSMITTER FREQUENCY

This is a continuation of application Ser. No. 08/034,012, filed Mar. 24, 1993 and now abandoned.

BACKGROUND OF THE INVENTION

1. Field of the Invention

The invention relates to a transmitter network comprising at least two transmitters having a like transmitter frequency and which transmit a like signal.

2. Description of the Related Art

Such a transmitter network is known from the technical article entitled "DAB—A new sound broadcasting system, Status of the development—Routes to its introduction" by G. Plenge in EBU Review no. 246, April 1991, Chapter 5.2.2, pp. 87–112.

When a conventional transmitter network is designed, for example, for broadcasting purposes, one is generally confronted with the problem that not enough channels are available for the signals to be transmitted. In that case one resorts to reusing frequencies, since under normal propagation conditions it is possible to receive in a certain area only one of the transmitters transmitting at a specific frequency and so no mutual disturbance need be expected. In such a conventional transmitter network, however, disturbances may nevertheless occur under special propagation conditions, such as, for example, tropospheric ducting.

In the transmitter network known from the above publication, a signal is transmitted with a like transmitter frequency via a plurality of transmitters, whereas a receiver can receive signals from different transmitters. As a result, a disturbance signal is developed having the characteristic of to an echo signal. This (undesired) echo signal is suppressed in the receiver by means of an echo canceller or by using a what is commonly referred to as a guard band in the time domain when the signal to be transmitted is actually transmitted. Consequently, it is possible for the received signal to be discarded in the receiver for a specific period of time during which the received signal is disturbed by the echo signals.

A great advantage of transmitter networks in which no more than a single transmitter frequency is used is that much fewer channels need to be available than when conventional transmitter networks are used having respective frequencies.

However, there may be a problem at the boundaries of the coverage areas of a plurality of such transmitter networks, because in that case signal received from a different transmitter network no longer has the features of an echo signal, and so the receiver cannot suppress the disturbing signals from a different network in an unqualified manner.

SUMMARY OF THE INVENTION

It is an object of the invention to provide a transmitter network as defined in the opening paragraph in which the disturbance caused by this transmitter network outside its coverage area is reduced.

For such purpose the transmitter network is characterized, in that it comprises a main transmitter and at least one auxiliary transmitter, the auxiliary transmitter having a smaller aerial height than that of the main transmitter, and each auxiliary transmitter being positioned on the boundary of the coverage area of the main transmitter.

By using a plurality of auxiliary transmitters with a smaller aerial height to the main transmitter, it becomes possible to realise a sharply defined coverage area of the transmitter network, which is meant to denote that with a specific size of the coverage area the disturbance caused outside this coverage area is reduced compared with the use of only a single main transmitter. If the auxiliary transmitters are installed on the boundary of the coverage area of the main transmitter, the size of the coverage area of the overall transmitter network is determined by the coverage area of the auxiliary transmitters. The field strength received from an auxiliary transmitter with a smaller aerial height than that of the main transmitter diminishes more rapidly as a function of the distance from the receiver to this auxiliary transmitter than does the field strength received from a main transmitter as a function of the distance from the receiver to the main transmitter. This is caused by the fact that with an auxiliary transmitter having a smaller aerial height the area in which direct-sight transmission occurs, wherein the field strength diminishes by the squared distance from the transmitter to a receiver, is smaller with for the auxiliary transmitter than for the main transmitter. Therefore, the area beyond the direct-sight distance, in which field strength is diminished by the fourth power of the distance, starts earlier. Due to this faster reduction of the received field strength, the coverage area of the overall transmitter network will thus be more sharply defined than the coverage area of a main transmitter alone.

A further feature of the invention is that further auxiliary transmitters may be positioned at the boundary of the coverage area of another auxiliary transmitter, the aerial height of the further auxiliary transmitters becoming ever smaller as the boundary of the coverage area of the transmitter network is approached.

By positioning smaller auxiliary transmitters at the boundary of the coverage area of an auxiliary transmitter, it is possible to supply a high-quality signal to an irregular coverage area without causing much disturbance outside this area.

BRIEF DESCRIPTION OF THE DRAWINGS

The invention will be further explained with reference to the drawings in which.

DESCRIPTION OF THE PREFERRED EMBODIMENTS

Figure 1:
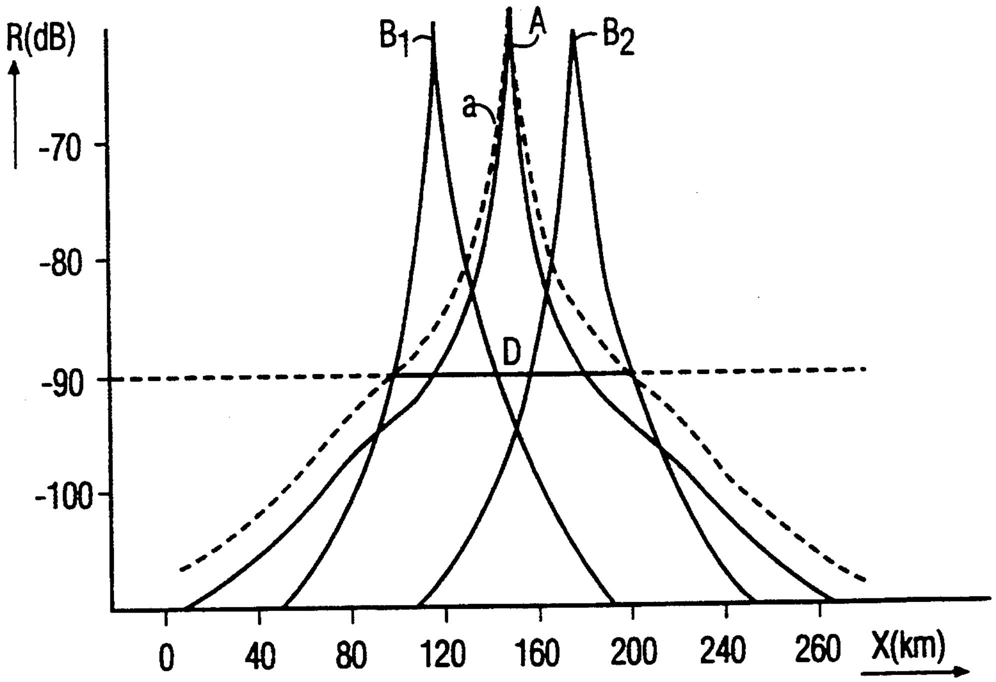
FIG. 1 shows the variation of received signal strength as a function of the position of the receiver when no more than one main transmitter is used and when a main transmitter and a plurality of auxiliary transmitters are used according to the invention.

The dashed line a in FIG. 1 shows the field strength of the received signal as a function of the position of a receiver when only a single main transmitter A is used. It is assumed that the coverage area is desired to have the size indicated by the solid line D and that the relative field strength within the coverage area is to be at least −90 dB. This −90 dB value may be determined, for example, by expected disturbance from transmitters in a neighbouring coverage area.

The variation of the field strength as a function of the distance is determined on the basis of formulas for the received field strength as a function of the distance of a transmitter, as described in the text "Microwave Mobile Communications" by W. C. Jakes, Wiley, 1974.

The solid lines show the received signal coming from the main transmitter A and auxiliary transmitters $B_1$, $B_2$ if the auxiliary transmitters $B_1$, $B_2$ are positioned 30 km apart around the main transmitter A. The aerial height of the main transmitter A is assumed to be a 300 meters and the height of the aerials of the auxiliary transmitters $B_1$ and $B_2$ is assumed to be 10 meters. FIG. 1 distinctly shows that the size of the overall coverage area of all the transmitters may be maintained with a considerably lower transmitter power of the main transmitter A. This lower power of the main transmitter leads to a smaller field strength of the received signal outside the coverage area, as a result of which the disturbance caused outside the coverage area is reduced proportionally.

Figure 2:
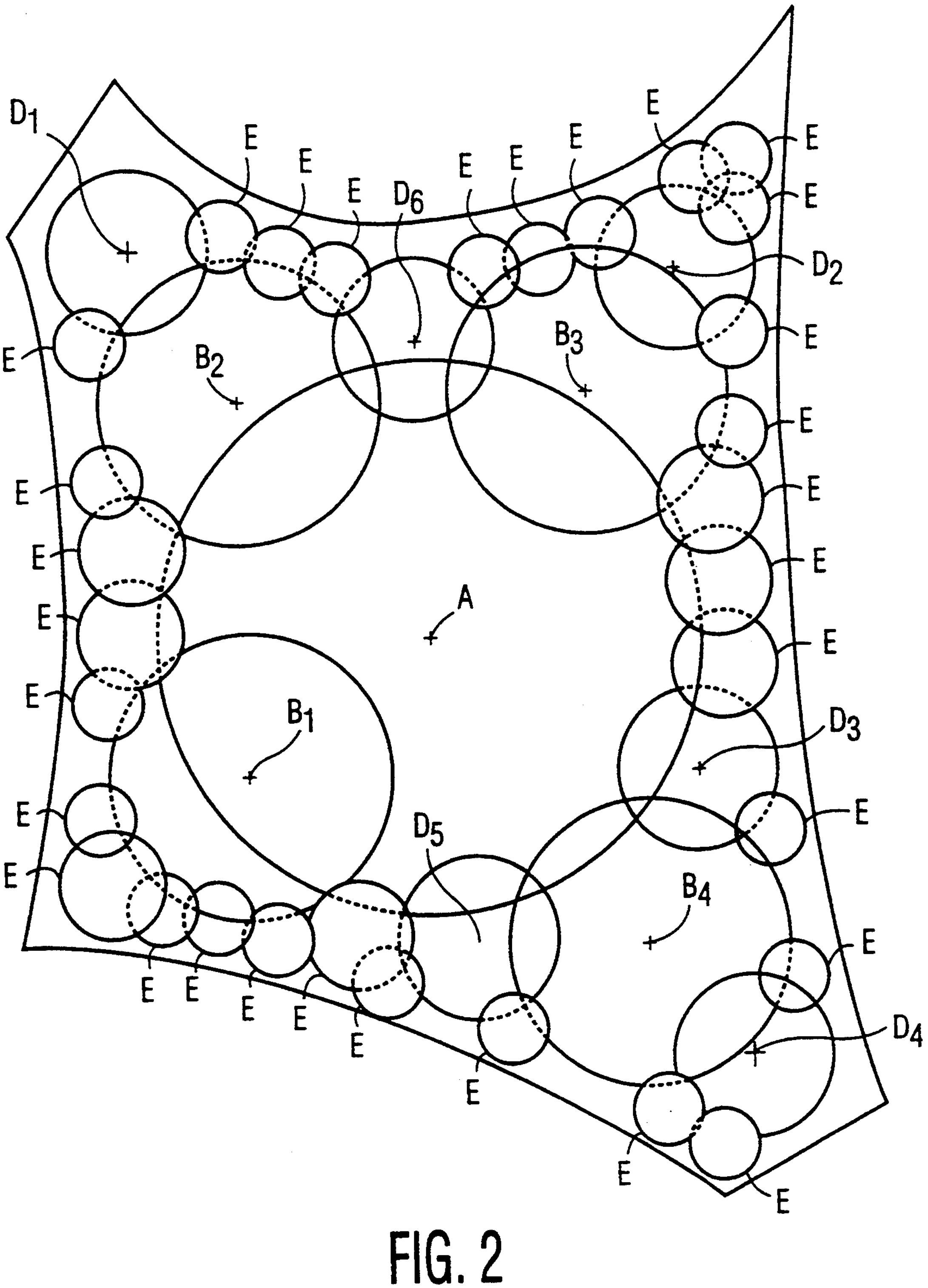
FIG. 2 shows the coverage area of a transmitter network in which auxiliary transmitters are used having an ever smaller aerial height as the boundary of the coverage area of the network is approached.

In the transmitter network as shown in FIG. 2 there is a main transmitter A supplying a signal to a large part of the coverage area. On the boundary of the coverage area of the main transmitter A four auxiliary transmitters $B_1$ to $B_4$ having a smaller aerial height are present increasing the overall coverage area. In addition, further auxiliary transmitters $D_3$, $D_5$ and $D_6$ and $D_1$, $D_2$ and $D_4$ respectively, are present on part of the boundary of the coverage area of the main transmitter A and on the boundary of the coverage area of the auxiliary transmitters $B_1$ to $B_3$, the further auxiliary transmitters having an aerial height again smaller than that of the associated auxiliary transmitters $B_1$ to $B_4$. Finally, still further auxiliary transmitters E having an even smaller aerial height are present for completely covering the desired coverage area.

I claim:

1. A transmitter network comprising:

a main transmitter and a plurality of auxiliary transmitters, all of said transmitters being operative at the same transmission frequency for transmitting the same signal;

each transmitter having an antenna and a broadcast coverage area the boundary of which is at a distance from the transmitter determined in part by the height of the antenna, so that a smaller antenna height results in a reduced coverage area and a reduced boundary distance;

a first set of said auxiliary transmitters having antenna heights smaller than that of the main transmitter, thereby having broadcast coverage areas smaller than that of the main transmitter, and located so that the broadcast coverage areas thereof respectively overlap respective portions of the boundary of the coverage area of said main transmitter; and a second set of said auxiliary transmitters having various antenna heights all of which are smaller than the antenna heights of said first set of auxiliary transmitters, the transmitters in said second set being distributed between the boundaries of the coverage areas of said first set of auxiliary transmitters and a desired coverage area boundary of the entire transmitter network, and located so that:

i) the coverage area of each transmitter in said second set overlaps a portion of the boundary of the coverage area of another transmitter in either of said first and second sets of transmitters; and ii) the antenna heights of transmitters in said second set are progressively smaller for transmitters which are progressively closer to said desired coverage area boundary of the entire transmitter network;

whereby the coverage area boundary of the entire transmitter network is more sharply defined than are the boundaries of the coverage areas of the individual transmitters in said network.

* * * * *